(12) United States Patent
Wolleswinkel

(10) Patent No.: US 6,646,731 B2
(45) Date of Patent: Nov. 11, 2003

(54) FLOW METER REMOTE READING SYSTEMS

(75) Inventor: Rick Wolleswinkel, De Meern (NL)

(73) Assignee: Melexis NV, Ieper (BE)

( * ) Notice: Subject to any disclaimer, the term of this patent is extended or adjusted under 35 U.S.C. 154(b) by 0 days.

(21) Appl. No.: 10/092,370

(22) Filed: Mar. 5, 2002

(65) Prior Publication Data

US 2002/0159076 A1 Oct. 31, 2002

Related U.S. Application Data

(60) Provisional application No. 60/280,685, filed on Mar. 30, 2001.

(51) Int. Cl.[7] .............................................. G01B 11/26
(52) U.S. Cl. .............. 356/138; 250/231.13; 340/870.02
(58) Field of Search ................................. 356/138, 614, 356/615, 622; 250/231.13, 231.14, 231.15; 74/567; 273/143; 340/870.02, 870.29

(56) References Cited

U.S. PATENT DOCUMENTS

| 4,500,870 A | * | 2/1985 | Krohn et al. .................. 341/14 |
| 5,880,464 A | * | 3/1999 | Vrionis ........................ 250/230 |
| 6,271,523 B1 | * | 8/2001 | Weaver et al. ........... 250/341.8 |

* cited by examiner

Primary Examiner—Richard A. Rosenberger
Assistant Examiner—Vincent Barth
(74) Attorney, Agent, or Firm—Townsend and Townsend and Crew LLP; Gerald T. Gray

(57) ABSTRACT

Systems and methods for determining the positions of the discs of a mechanical display by using the shadow cast on an optical array by a profiled cam arrangement.

27 Claims, 6 Drawing Sheets

FLOW METER REMOTE READING SYSTEMS

CROSS-REFERENCES TO RELATED APPLICATIONS

This application claims the benefit of U.S. Provisional Patent Application Serial No. 60/280,685, filed Mar. 30, 2001, entitled "FLOW METER REMOTE READING SYSTEMS," the contents of which are hereby incorporated by reference in its entirety for all purposes.

BACKGROUND OF THE INVENTION

The present invention relates in general to systems and methods for reading utility meters and more particularly to systems and methods for remote reading of multi-digit displays on utility meters.

Multi-digit displays are common on the meters used by utility companies to record the consumption of gas, heat, electricity or water. Such records and displays are used by the utility company for billing purposes and by the customers as an indication of consumption.

A number of Automatic Meter Reading (AMR) systems have been devised, including S0 counting interface systems, optical character recognition (OCR) systems and non-visible coding systems. The S0 counting interface, which is the most common system, includes a small magnet mounted on the fastest turning wheel (the Least Significant Digit, LSD). As the magnet passes a fixed reference point a count is incremented. The count is typically stored in non volatile memory. In an optical character recognition system, an electronic apparatus is typically placed over the current mechanical display. The apparatus uses optical character recognition techniques to recognize the numbers on the display. Such a system is usually carried by a human meter reader and therefore addresses some accuracy issues but may not be cost effective. In a non-visible coding system, a machine readable code is marked on the wheels in a position not readily visible to a human reader, or such a code is marked on a duplicate set of wheels arranged to replicate the count of the primary wheels.

These above known solutions each have one or more disadvantages that limit their widespread use on the market. For example, one disadvantage is that a permanent electrical supply may be required which can pose a potential risk for fire or explosions in a meter, especially for gas meters. Another disadvantage is that a failure, accidental, intentional or malicious, to the power supply to the meter can cause failure of the count mechanism and loss of accuracy and revenue. In addition, the displayed value is assumed to be the same as the electronic value but this may not be the case which may lead to customer dissatisfaction.

Accordingly, it is desirable to provide remote meter reading systems. Such systems should be cost effective and have low power consumption requirements. Additionally, such systems should not be larger than the standard meters for retrofit.

SUMMARY OF THE INVENTION

The present invention provides low cost systems and methods for reading of multi-digit mechanical displays, such as the displays used in meters supplied by utility companies to record and display the individual customers' consumption of gas, electricity or water. The system of the present invention uses an optical sensor to detect the value of the display by sensing the width of a shadow cast by a cam profile implemented onto the axis of existing mechanical display wheels. The arrangement allows for the remote reading via a modem on a telephone line, or via a radio link transmitted over a mobile network, or other such connections. The system is further arranged to have low power consumption and is preferably powered entirely from a telephone connection.

Considerable expertise and experience has been built into the design of such meters in terms of safety, accuracy, power supply independence and customer acceptance. The present invention therefore allows for the remote reading of mechanical displays such as are found in these established meters without the risk of compromising the current acceptability of such meters.

Remote reading of utility meters offers a number of benefits, including, for example:

Customers only pay for actual usage and not on estimated usage;

Customers can more easily exercise their right of choice between utility companies;

Customers can feel they have more immediate control over consumption and spending;

Traditional methods of manual meter reading can be time consuming, error prone and costly, especially where multiple meters are installed; and High energy prices and energy related taxes increases the potential for fraud and remote reading allows for higher levels of monitoring to determine abnormal consumption patterns.

The present invention provides techniques for directly reading the position of each of the discs that make up the display by optically determining the width of a shadow cast by a cam profile attached to each wheel. The techniques of the present invention do not affect the existing display system or affect the accuracy and appearance of the current system.

In one embodiment of the invention the discs are read in parallel. In a second embodiment, the discs are read sequentially to save power. In another embodiment, the entire reading system is powered entirely from a modem connected to the telephone line and is inherently suitable for meters associated with gas systems and other such potentially combustible systems. In yet another embodiment, only one photosensor is used to read the position of the discs thereby additionally saving both cost and power.

According to an aspect of the present invention, a meter reading system is provided for determining the rotational position of one or more rotating display discs. The system typically includes a cam associated with each disc, wherein each cam rotates with the associated disc, a light source that illuminates each cam such as to project a shadow for each cam, and a light detecting element that detects the shadow of each cam and provides a signal representing parameters of each shadow. The system also typically includes a processor that determines the rotational position of each disc based on the respective shadow parameters provided by the light detecting element.

According to another aspect of the present invention, a method is provided for reading a meter having one or more rotating display discs. The method typically includes providing a cam associated with each disc, wherein each cam rotates with the associated disc, illuminating each cam so as to project a shadow on a light detecting element, and determining rotational position information for each disc based on the associated cam shadow detected by the light detecting element.

According to a further aspect of the present invention, a system is provided for remote reading of a display wherein the display is created by the alignment of one or more discs mounted and rotated around a common axis. The system typically includes a projection mounted on or part of each of said discs substantially at right angles to the plane of rotation of the discs, a separate light emitting means and lens means associated with each disc, a photo-detection means associated with each disc, wherein the profile of said projection being such that when illuminated by said light emitting means the width and position of the shadow cast by said projection onto said photo-detection means allows for the determination of the rotational position of the disc. The system also typically includes a control means to control the light emitting means and read the photo-detection means such as to determine the position of each disc, and communication means to transmit the determined positions of the discs to a remote reader.

According to yet a further aspect of the present invention, a system is provided for remote reading of a display wherein the display is created by the alignment of one or more discs mounted and rotated around a common axis. The system typically includes a projection mounted on or part of each of said discs substantially at right angles to the plane of rotation of the discs, a separate light emitting means and lens means associated with each disc, and an optical arrangement arranged to reflect each of the shadows cast by the projections onto a single photo-detection means, the profile of said projection being such that when illuminated by said light emitting means the width and position of the shadow cast by said projection onto said photo-detection means allows for the determination of the rotational position of the disc. The system also typically includes control means to control the light emitting means and read the photo-detection means such as to determine the position of each disc, and communication means to transmit the determined positions of the discs to a remote reader.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
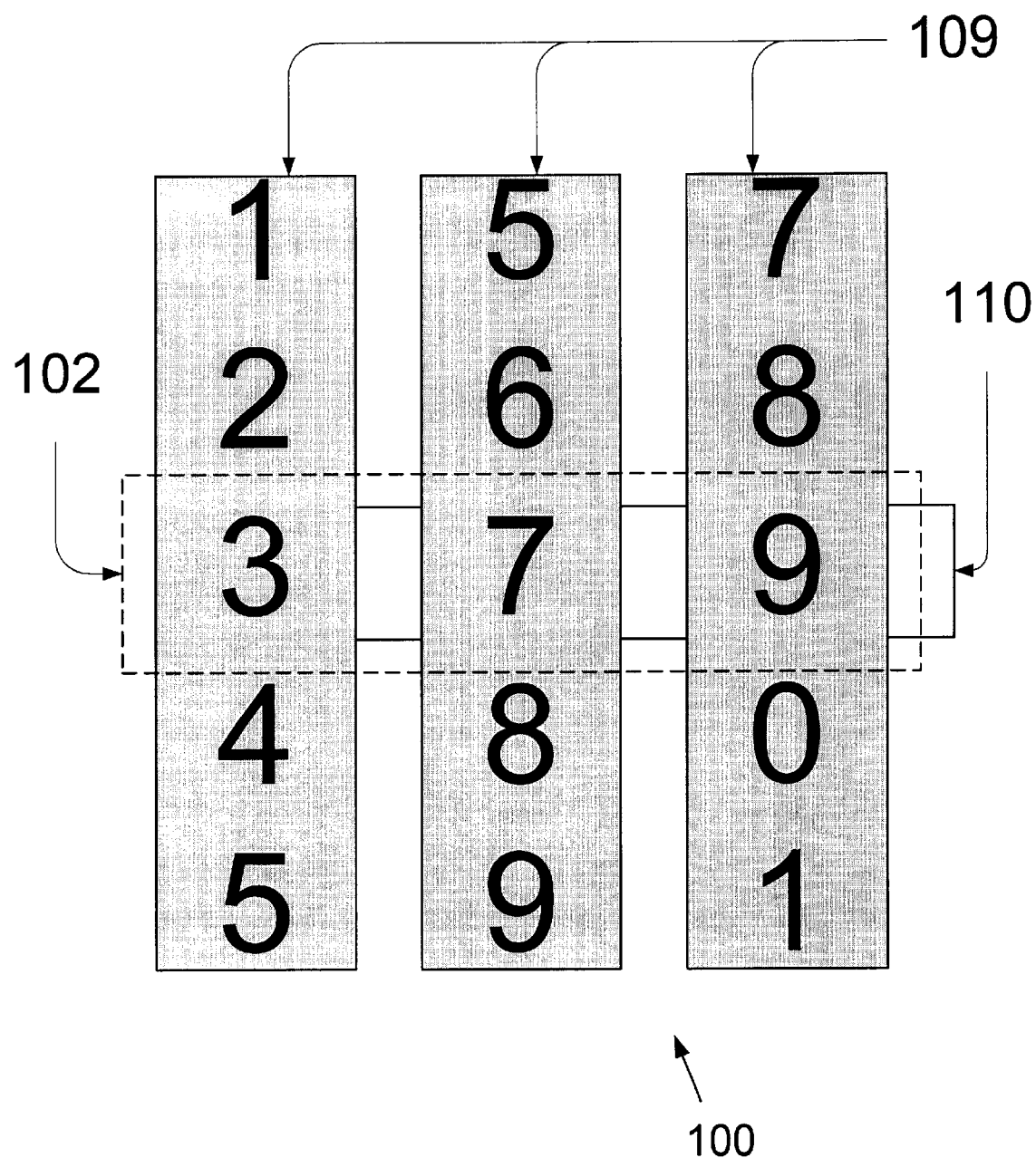
FIG. 1 is a schematic diagram showing an arrangement of display wheels as found in a typical utility meter.

As shown in FIG. 1, in a typical meter used by a utility company for recording and displaying consumption, a display 100 is formed by a plurality of discs, or wheels, 109 on a common axis spaced apart by the thickness of a boss 110 associated with each disc. The discs 109 carry on their outer edge the numerals 0–9. The mechanism for driving discs 109 is well known and forms no part of the present invention. The discs 109 rotate about a common axis, as defined by the center of the discs 109 and/or the center of each boss 110, and are typically viewed by the customer or meter reader through a window or aperture 102 in the casing or housing (not shown). To maintain the reliability and customer acceptance of this traditional method of display, it is desirable to be able to automatically read and transmit the numbers displayed to a remote central point, e.g., over a telephone line, for processing and billing.

Figure 2:
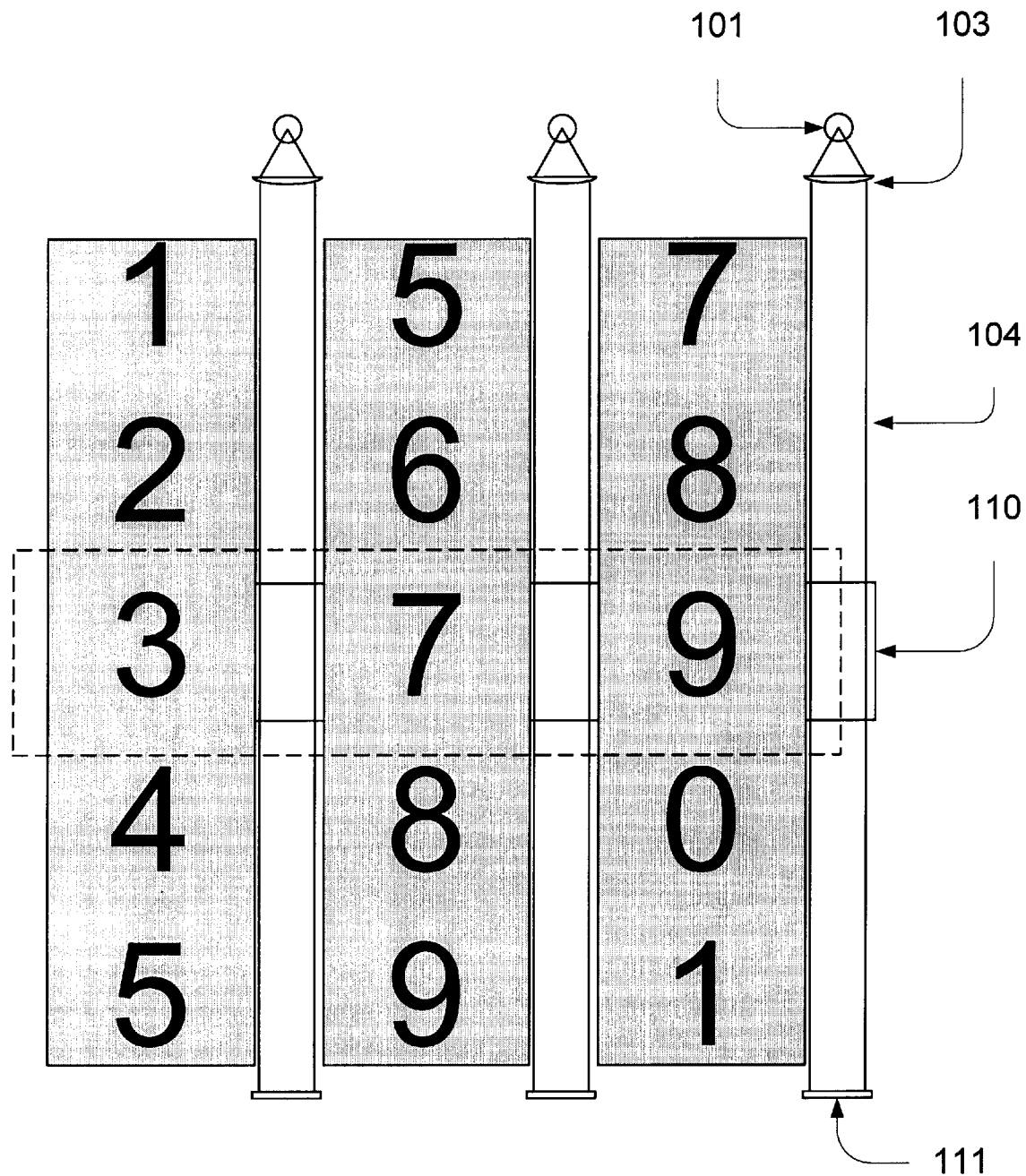
FIG. 2 is a schematic showing the wheels of a utility meter with the addition of an arrangement of optical elements for reading the position of the wheels in accordance with an embodiment of the present invention.

FIG. 2 is a schematic showing the wheels of a utility meter with the addition of an arrangement of optical elements for reading the position of the wheels in accordance with an embodiment of the present invention. Between each disc is arranged a light source 101 and a lens system 103, which combine to shine a beam 104 of substantially parallel light down between the discs thereby casting a shadow of the boss 110 associated with each disc 109 onto a light sensing module 111. Each light source 101 preferably includes a light emitting diode (LED), however any light source as is practical may be used, such as a semiconductor laser, gas laser or other light emitting element. The direction of the light is preferably substantially perpendicular to the viewing direction of a human reader so as to minimize or substantially reduce light entry and reflections from outside the meter housing.

Figure 3:
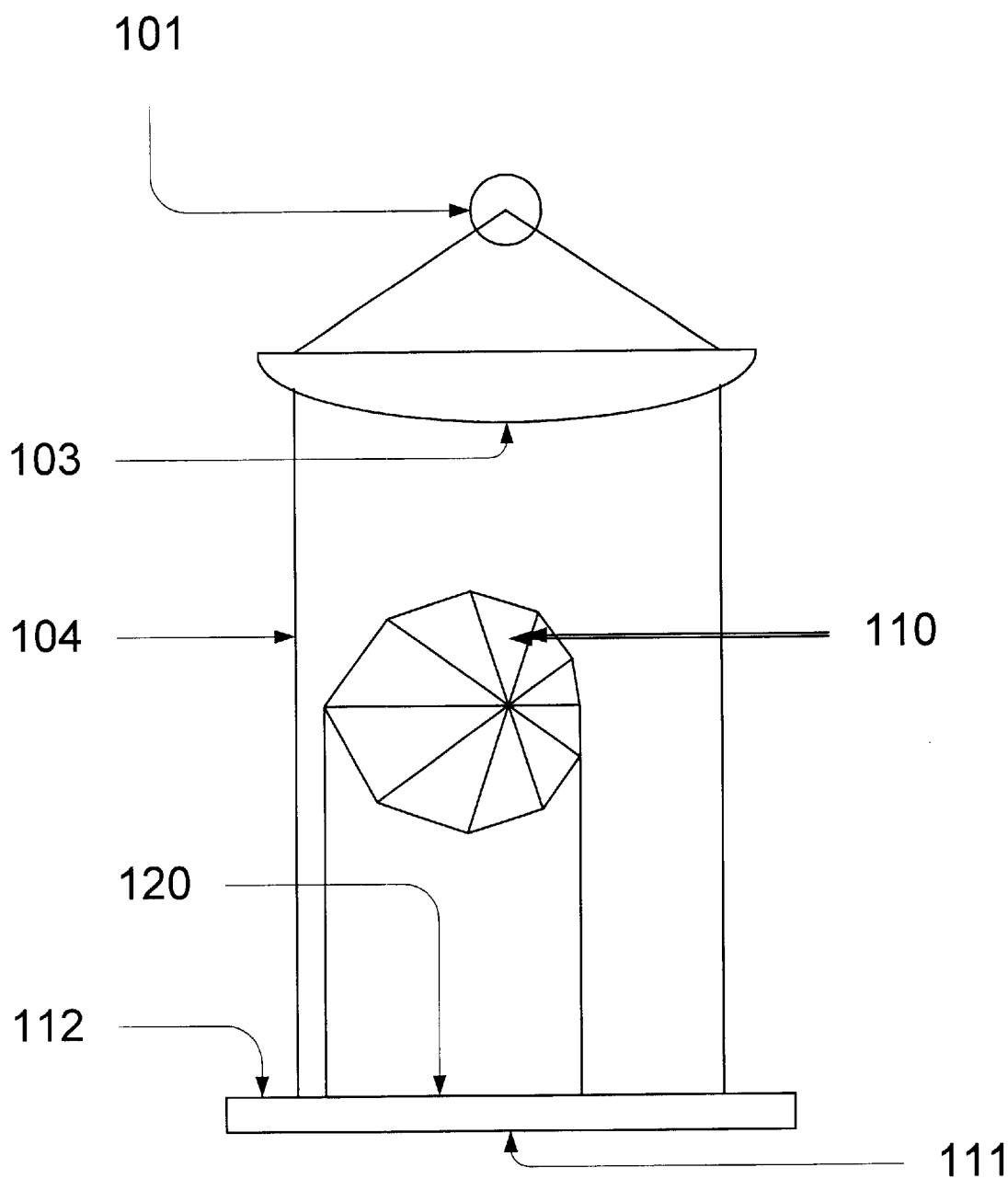
FIG. 3 is a schematic diagram of a portion of the optical element arrangement of FIG. 2 when viewed from the side according to an embodiment of the present invention.

Rather than having a symmetrical, circular profile as is standard, each boss 110 is preferably configured and arranged to have an asymmetric profile as illustrated in FIG. 3. The shadow 120 cast by the boss 110 (hereinafter "cam 110" to distinguish the asymmetric profile) onto the surface 112 of the light sensing module 111 will have a different width and position (e.g., position of center and edges) on the surface of the light sensing module 111 depending on the rotational position of the cam 110, which is arranged to be unique for each of the ten rotational positions of the disc. Each of the ten positions preferably corresponds to one of the ten numbers 0–9 displayed on the disc. The rotational position of the cam is identified by determining the number of light sensing elements covered by the shadow of the cam 110 and/or by the position of the shadow on the light sensing element module 111 (e.g., center position and/or edges of shadow). It should be appreciated that more than or fewer than ten rotational positions may be determined, that other characters besides numbers may be displayed, and that cam 110 may be configured to provide a sufficient number of distinct shadow profiles to distinguish the rotational positions.

In one embodiment, each light sensing module 111 includes an array of light sensing elements, such as photodiodes, of sufficient discreetness to detect the different widths and positions of the shadow 120 created by the different rotational positions of the cam 110. For example, one useful sensor is the MLX90255 Linear Optical Array sensor, in a SMD8 package, available from Melexis Inc. (see URL: www.melexis.com). The MLX90255 sensor includes a linear array of 128 light sensing photodiodes. In one implementation using the MLX90255 sensor, for example, the dimensions of the cam 110 and the width of the parallel beam 104 are arranged such that, with due allowance for assembly tolerances, the maximum excursion of the shadow 120 across the sensor array covers approximately 100 of the light sensing photodiode elements.

Figure 5:
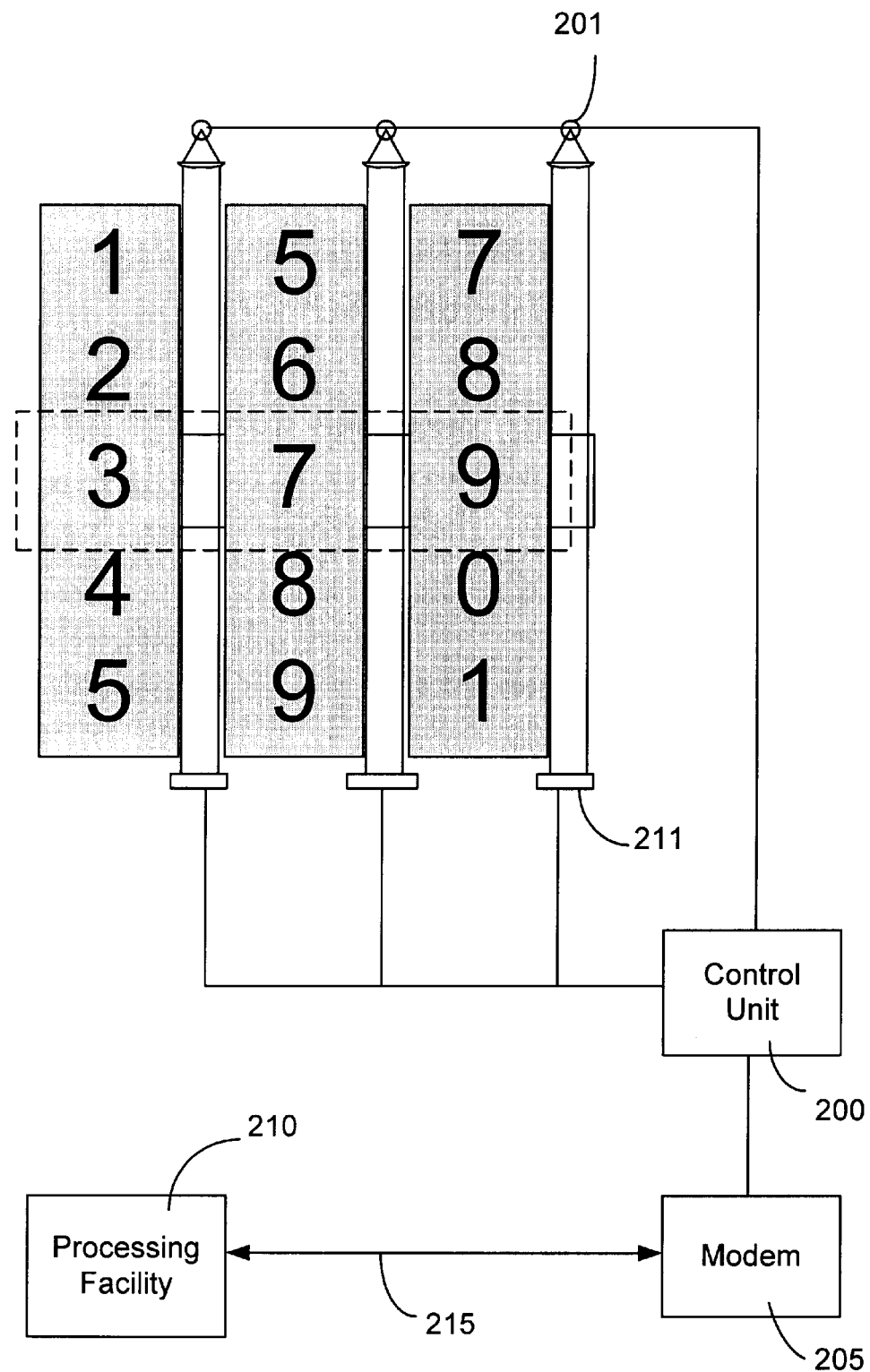
FIG. 5 is a schematic diagram of an overall meter reading system arrangement including a control unit and a modem according to an embodiment of the present invention.

FIG. 5 is a schematic of an overall meter reading system arrangement including a control unit 200 and a modem 205 for communicating with a remote processing facility 210 over a telephone line 215. The control unit 200 determines the timing for a remote reading and powers up the light sources 201, and receives the output from the relevant light sensing module 211 in order to determine the correct value for each disc. In one embodiment, the control unit 200 powers up the light sources one at a time to allow for reading of each light sensing module 211 in turn. Alternatively, the control unit controls the light sources to power up at the same time to allow for a concurrent reading of all the light sensing modules 211. The controls unit 200 then communicates with the remote processing facility 210, e.g., utility company office, via the modem 205 and communicates the values together with a unique serial number identifying the meter itself. A memory unit coupled to the control unit may be included to store the serial number and any data values as desired. In one embodiment, the control unit 200 is configured to compare the current reading with any previous readings so as to detect abnormal usage, perform error checking and/or set a basis for flow predictions. Alternatively, a processing unit at the processing facility or other location may perform such comparisons and calculations.

In one embodiment, the modem 205, and the control unit 200 are preferably embodied in a low power microcontroller and draw all their power requirements from the telephone line, e.g., a PSTN line interface power connection. One useful microcontroller is the MLX32001 Universal PSTN Line Interface controller IC available from Melexis, Inc. (www.melexis.com). The MLX32001 controller implements the DC-handler of a universal PSTN line interface and is a fully telephone line (e.g., PSTN) powered device that provides a power source for auxiliary components, such as, for example, LED or other light sources, and a host controller such as a Texas Instruments MSP430 series controller, when used in systems according to the present invention. The MLX32001 controller also includes an integrated RAM memory and provides a power supply for the MLX90255 sensor and/or its controller.

Figure 4:
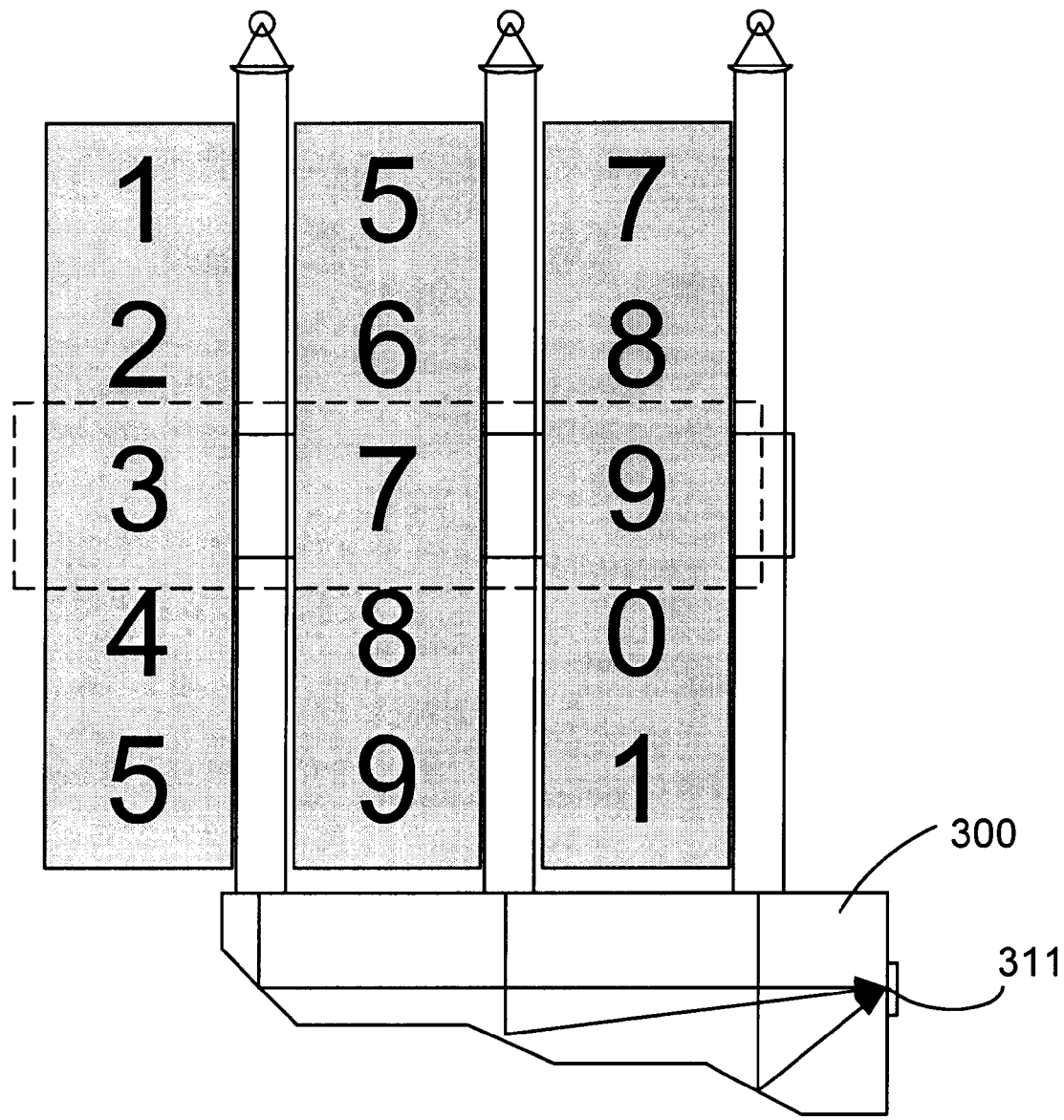
FIG. 4 is a schematic diagram of a meter reading system arrangement that uses a light conductor and a single photo-sensing array according to an embodiment of the present invention.

To further reduce the power requirements and reduce costs, according to one embodiment as shown in FIG. 4, multiple light sensing modules 111 are replaced by a single optical element 300, such as an optical plastic molding. Element 300 includes, in one embodiment, optically reflective surfaces arranged to reflect the images of the shadows from the various cams on to a single light sensing module 311, such as a module including a single array of light sensing elements.

Figure 6:
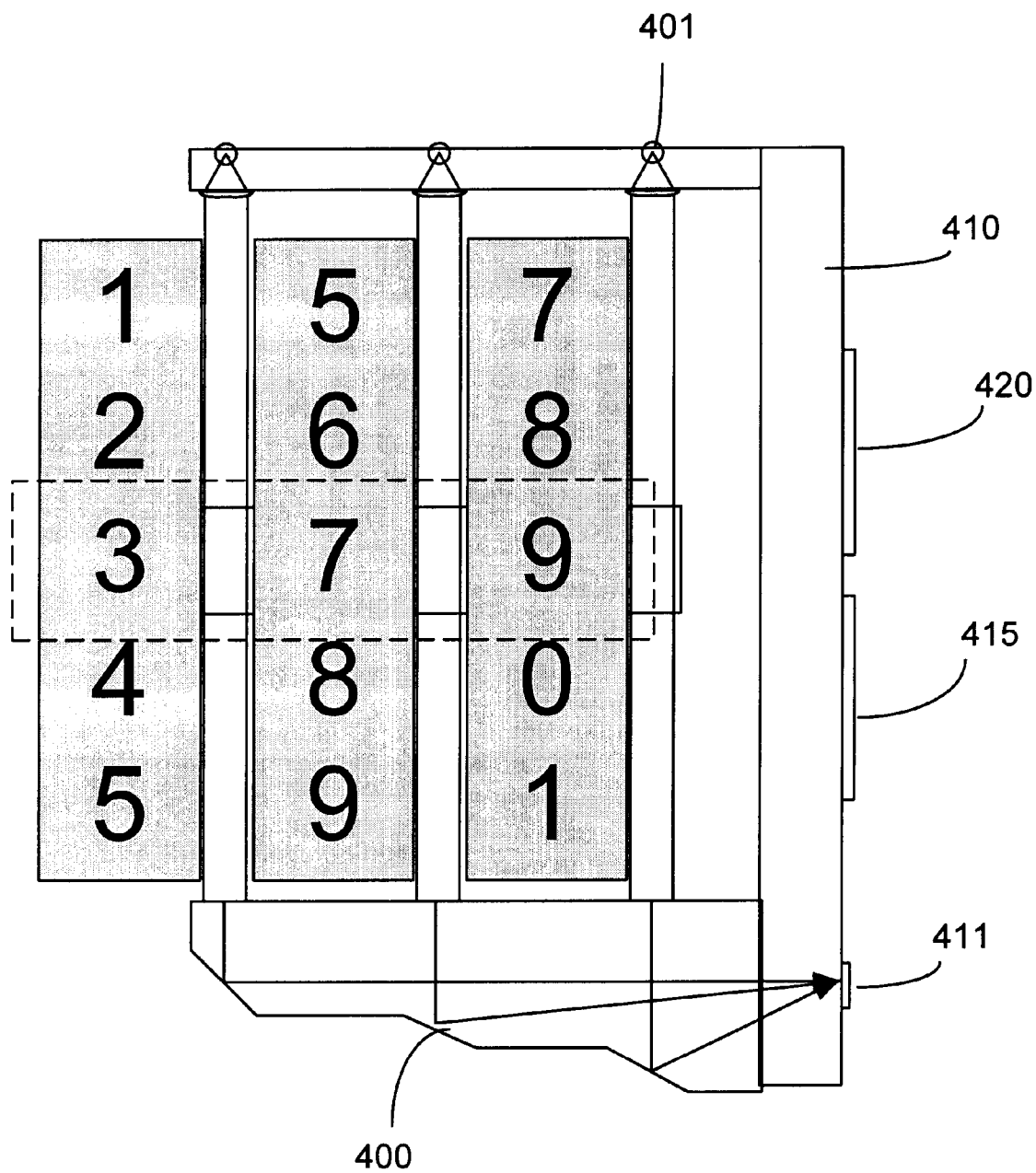
FIG. 6 is a schematic diagram of a meter reading system arrangement including a bridge assembly according to an embodiment of the present invention.

FIG. 6 is a schematic diagram of a meter reading system arrangement including a bridge assembly 410 according to an embodiment of the present invention. Control unit 420 and modem 415 are assembled onto bridge assembly 410, which preferably links between, and connects mechanically, the light source and lens arrangements 401 and the light sensing module(s). Bridge assembly 410 also provides for integrated electrical connections between the various elements. As shown, for example, bridge assembly 410 includes a single light sensing module 411 that receives cam profile images from reflective element 400 similar to the embodiment of FIG. 4. Preferably reflective element 400 is assembled onto bridge 410, or integrated as part of bridge 410, although reflective element 400 may be separate therefrom. It should be appreciated that an arrangement of separate light sensing modules similar to the embodiment shown in FIG. 5 can be assembled onto the bridge assembly 410 or integrated as part of bridge 410. Bridge assembly 410 is preferably a single plastic molded assembly, e.g., using a plastic molding process, for ease of manufacture, but it may be formed of metal, ceramic or any combination of materials as desired, or it may be formed of several separately molded or formed pieces.

Additional processing circuitry for any of the above implementations can include analogue and/or digital circuitry. In one digital implementation, a microprocessor is used as both a control and processing circuit, and can further be integrated with a memory, such as a non volatile memory unit, as storage for look up tables or other constants that are used for optimization and calibration of the system.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, it should be appreciated that a single light source may be used to illuminate all cams in conjunction with appropriately selected and configured optical elements to reflect and/or transmit the illumination onto the cams toward the light sensing modules. It should also be appreciated that the present invention is also applicable to providing an electronic reading for similar displays having rotating discs as are typical in gaming machines such as slot machines. Therefore, the scope of the appended claims should be accorded the broadest interpretation so as to encompass all such modifications and similar arrangements.

What is claimed is:

1. A meter reading system for determining the rotational position of one or more rotating display discs, the system comprising:
ca cam associated with each disc, wherein each cam rotates with the associated disc;
a light source that illuminates each cam such as to project a profile shadow for each cam;
a light detecting element that detects the shadow of each cam and provides a signal representing parameters of each shadow; and
a processor that determines the rotational position of each disc based on the respective cam profile shadow parameters provided by the light detecting element.

2. The system of claim 1, wherein the light detecting element includes a linear array of discrete light sensing elements.

3. The system of claim 2, wherein each light sensing element comprises a photodiode.

4. The system of claim 1, wherein the shadow parameters include width information for each shadow, and wherein the processor determines the rotational position of each disc based on the width of the respective cam profile shadow.

5. The system of claim 1, wherein the light source includes a single light source and optical elements configured and arranged to illuminate each cam with light from the single light source.

6. The system of claim 5, wherein the optical elements include one or more beamsplitting elements.

7. The system of claim 1, wherein the light source includes an individual light source associated with each cam.

8. The system of claim 1, wherein the light detecting element includes a single array of discrete light sensing elements and one or more reflection elements for directing each of the one or more cam profile shadows onto the array.

9. The system of claim 1, wherein the light detecting element includes an individual light sensing element associated with each cam.

10. The system of claim 1, further including a communication module for connecting to a telephone network, wherein the processor is configured to automatically send the rotational position of each disc to a remote location over the telephone network.

11. The system of claim 10, wherein the communication module includes a PSTN interface.

12. The system of claim 11, wherein the electrical power for operating the meter reading system is drawn from the PSTN interface.

13. A method of reading a meter having one or more rotating display discs, the method comprising:
  providing a cam associated with each disc, wherein each cam rotates with the associated disc;
  illuminating each cam so as to project a profile shadow on a light detecting element; and
  determining rotational position information for each disc based on the associated cam profile shadow detected by the light detecting element.

14. The method of claim 13, wherein the light detecting element includes a linear array of discrete light sensing elements.

15. The method of claim 14, wherein each light sensing element comprises a photodiode.

16. The method of claim 14, wherein determining rotational position information for each disc includes determining the number of light sensing elements covered by the shadow.

17. The method of claim 14, wherein determining rotational position information for each disc includes determining the central light sensing element of the light sensing elements covered by the shadow.

18. The method of claim 13, wherein determining rotational position information for each disc includes determining one of the width and a center position of the shadow.

19. The method of claim 13, further including automatically communicating the rotational position information to a remote system over a telephone communication channel.

20. The method of claim 13, wherein each of the one or more cams are illuminated simultaneously.

21. The method of claim 13, wherein each of the one or more cams are illuminated successively in an order.

22. A system for remote reading of a display having one or more aligned discs that rotate around a common axis, the system including:
  a cam coupled to each of said discs substantially at right angles to the plane of rotation of the discs;
  a separate light emitting means and lens means associated with each said disc;
  a photo-detection means associated with each said disc;
  the profile of said cam being such that when illuminated by said light emitting means, the width and position of the shadow cast by said cam onto said photo-detection means allows for the determination of the rotational position of the disc;
  control means to control the light emitting means and read the photo-detection means such as to determine the rotational position of each disc; and
  communication means to transmit the determined rotational positions of the discs to a remote system.

23. The system of claim 22, wherein the control means controls only one light emitting means at a time to emit light such that the rotational positions of the discs are determined in sequence and stored in a memory, and wherein the stored position values are transmitted by the communication means to the remote system.

24. The system of claim 22, wherein the control means controls all the light emitting means to emit light simultaneously such that the rotational positions of the discs are determined concurrently.

25. A system for remote reading of a display having one or more aligned discs that rotate around a common axis, the system including:
  a cam coupled to each of said discs substantially at right angles to the plane of rotation of the discs;
  a separate light emitting means and optical arrangement associated with each said disc;
  a single photo-detection means for detecting light emitted by the light emitting means;
  the profile of said cam being such that when illuminated by said light emitting means the width and position of the shadow cast by said cam onto said photo-detection means allows for the determination of the rotational position of the disc;
  an optical arrangement arranged to reflect each of the shadows cast by the cams onto said single photo-detection means;
  control means for controlling the light emitting means and reading the photo-detection means such as to determine the rotational position of each disc; and
  communication means for transmitting the determined rotational positions of the discs to a remote system.

26. The system of claim 25, wherein the control means controls only one light emitting means at a time to emit light such that the rotational positions of the discs are determined in sequence and stored in a memory, and wherein the stored position values are transmitted by the communication means to the remote system.

27. A system for determining the rotational position of one or more rotating display discs, the system comprising:
  a cam associated with each disc, wherein each cam rotates with the associated disc;
  a light source that illuminates each cam such as to project a profile shadow for each cam;
  a light detecting element that detects the shadow of each cam and provides a signal representing a parameter of each shadow; and
  a processor that determines the rotational position of each disc based on the respective cam profile shadow parameters provided by the light detecting element.

* * * * *

UNITED STATES PATENT AND TRADEMARK OFFICE
CERTIFICATE OF CORRECTION

PATENT NO.      : 6,646,731 B2
DATED           : November 11, 2003
INVENTOR(S)     : Wolleswinkel, Rick It is certified that error appears in the above-identified patent and that said Letters Patent is hereby corrected as shown below:

<u>Column 6,</u>
Line 40, delete "ca" and insert therefor -- a --.

Signed and Sealed this

Twenty-fourth Day of February, 2004

JON W. DUDAS
*Acting Director of the United States Patent and Trademark Office*